(12) United States Patent
Tomita et al.

(10) Patent No.: US 7,350,035 B2
(45) Date of Patent: Mar. 25, 2008

(54) INFORMATION-PROCESSING APPARATUS AND ELECTRONIC EQUIPMENT USING THEREOF

(75) Inventors: Hiroto Tomita, Kasuya-Gun (JP); Masatoshi Matsuo, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 295 days.

(21) Appl. No.: 10/902,805

(22) Filed: Aug. 2, 2004

(65) Prior Publication Data

US 2005/0033927 A1    Feb. 10, 2005

(30) Foreign Application Priority Data

Aug. 7, 2003    (JP) .............................. 2003-288841

(51) Int. Cl.
*G06F 12/00* (2006.01)
*G06F 13/00* (2006.01)
(52) U.S. Cl. .................... 711/148; 712/229; 710/14
(58) Field of Classification Search ........... 711/147, 711/148
See application file for complete search history.

(56) References Cited

U.S. PATENT DOCUMENTS 5,117,350 A    5/1992    Parrish et al.

2002/0128037 A1*  9/2002  Schmidt ................. 455/553
2003/0093628 A1*  5/2003  Matter et al. ............ 711/153

FOREIGN PATENT DOCUMENTS

JP    7-79402    3/1995

* cited by examiner

*Primary Examiner*—Gary Portka
*Assistant Examiner*—Hamdy S Ahmed
(74) *Attorney, Agent, or Firm*—Wenderoth, Lind & Ponack, L.L.P.

(57) ABSTRACT

An information-processing apparatus comprises a motion-detecting unit, a motion-compensating unit, a DCT/IDCT unit, a Q/IQ unit, a VLC unit, a VLD unit, and a DSP unit, as a plurality of units. A mode-controlling unit can utilize at least two modes of used of the information-processing apparatus. One mode is a "process mode" where the processing of moving picture are performed, and another mode is a "memory mode" where all internal memories of the plurality of processing units are logically combined to be directly accessible from the outside as one memory via an interface unit.

6 Claims, 9 Drawing Sheets

INFORMATION-PROCESSING APPARATUS AND ELECTRONIC EQUIPMENT USING THEREOF

BACKGROUND OF THE INVENTION

1. Field of the Invention

The present invention relates to an information-processing apparatus comprising a plurality of processing units operable to perform respectively predetermined process, respectively, and a memory unit. The information-processing apparatus and the memory unit being operable as an externally accessible memory device when operation mode is switched.

2. Description of the Related Art

In recent years, infrastructures of high-speed telecommunication including third generation mobile communications have been widely prepared, with a remarkable increase in the amount of information that can be transmitted. Consequently, data that is transmitted in the mobile communications may contain not only data of audio, text and still images, but also data of moving pictures.

MPEG-4, which is proposed by the Moving Picture Experts Group, is adapted as a moving picture-coding format in the third generation mobile communications. Generally, when moving pictures are processed according to MPEG-4, huge amount of processes are needed. When a mobile telecom terminal, which is driven by a battery, adopts MPEG-4, problems encountered by the mobile telecom terminal include a need for rapid processing of the huge amount of data, and lowering power consumption.

From this viewpoint, a moving picture-processing-designed LSI, which is mounted in the mobile telecom terminal, comprises a processor and a plurality of special purpose hardware, thereby, distributing load in processing moving pictures, as well as reducing power consumption.

Assume that the moving picture-processing-designed LSI is implemented onto an image-processing apparatus. When the image-processing apparatus processes a still image, the moving picture-processing-designed LSI does not operate in many cases. Meanwhile, the plurality of special purpose hardware of the moving picture-processing-designed LSI, contain respective local memories.

In order to effectively use resources of the image-processing apparatus, it is considerable to utilize for other purposes the local memories of the moving picture-processing-designed LSI, when the moving picture-processing-designed LSI does not operate. It is further considerable to change an operation mode of the moving picture-processing-designed LSI to make the local memories of the moving picture-processing-designed LSI accessible externally.

A document 1 (Japanese Patent Application Laid-Open No. H07-78876) discloses conventional arts to change a mode to make a plurality of circuit blocks externally accessible.

Figure 9:
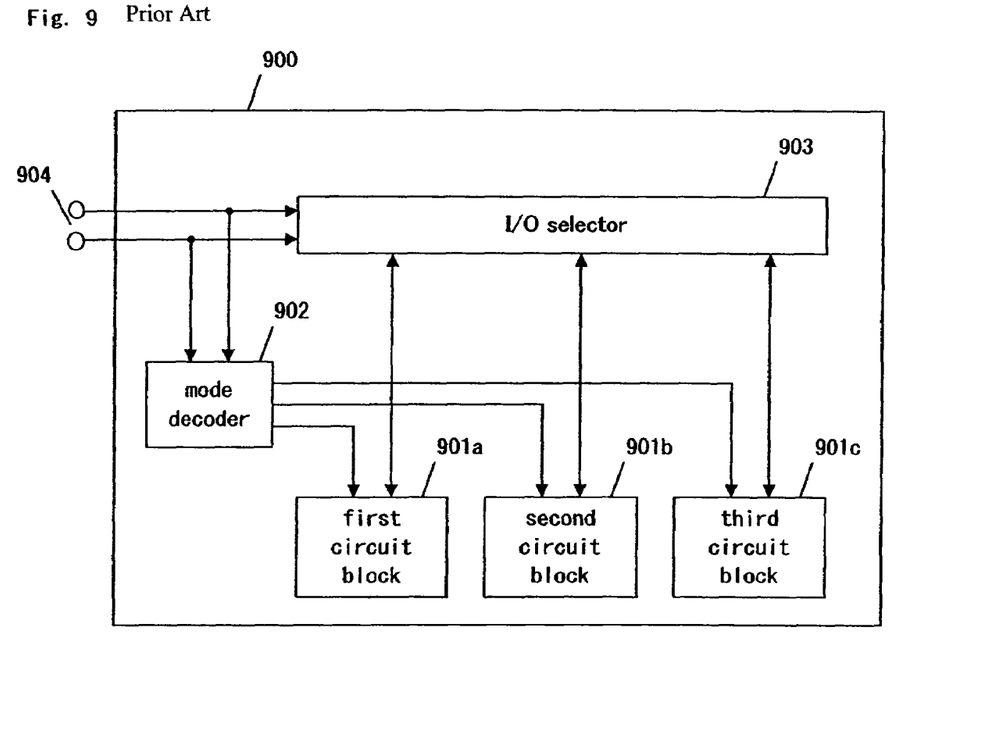
FIG. 9 is a block diagram of a conventional LSI.

FIG. 9 is a block diagram of a conventional LSI 900 that enables external access to the plurality of circuit blocks. FIG. 9 corresponds to FIG. 1 of the document 1. The LSI 900 comprises a mode decoder 902, an I/O selector 903, a first circuit block 901a, a second circuit block 901b, and a third circuit block 901c. Based on mode setting data supplied from the outside, the I/O selector 903 selects one of the first circuit block 901a, the second circuit block 901b, and the 3rd circuit block 901c. The mode decoder 902 changes an operation mode of the selected circuit block, and data is transmitted between the selected circuit block and the outside via a terminal 904.

However, if the above-mentioned art is improved such that local memories contained by the circuit blocks can be accessed from the outside, amount of data that can be transmitted at once is limited to the capacity of a local memory of one circuit block. Furthermore, whenever a circuit block to which a local memory to be used belongs is changed, operation modes of two corresponding circuit blocks (a current circuit block and a next circuit block) should be changed. Therefore, complicated processes cannot be avoided.

Values of capacity, bit width and address width of the local memories are optimized according to functions of the circuit blocks to which the local memories belong, respectively. In general, the values are different for every circuit block. A programmer or a designer, who utilizes the local memories from the outside, should take into consideration the values of capacity, bit width and address width of each local memory.

In some cases, the local memories are composed of different kinds of memories (an SRAM and a DRAM, and so on), all of the local memories cannot be accessed using one kind of memory-accessing method. In other words, a plurality of memory-accessing methods should be prepared, and a method suitable for current accessing should be selected to use among the plurality of memory-accessing methods, therefore, handling the local memories is troublesome.

BRIEF SUMMARY OF THE INVENTION

An object of the present invention is to provide an information-processing apparatus that local memories thereof can be easily accessed from the outside.

A first aspect of the present invention provides an information-processing apparatus operating in a plurality of operation modes, the apparatus comprising, a plurality of processing units, wherein, when one of the plurality of operation modes is selected, the plurality of processing units perform predetermined processes, respectively. further, when the other of the plurality of operation modes is selected, the plurality of processing units respectively operate as an externally accessible memory device.

With this structure, when the operation mode changed, the information-processing apparatus can be used as a memory device, thereby resources of the information-processing apparatus are effectively utilized without complicated processing.

A second aspect of the present invention provides an information-processing apparatus comprising, a processing unit comprising a local memory, and a memory unit. Further, wherein the local memory and the memory unit operate as an externally accessible memory device, according to a selecting instruction, respectively.

With this structure, since the local memory of the processing unit and the memory of the memory unit can be utilized as an independent memory accessible from the outside, the information-processing apparatus can be used for multiple purposes.

A third aspect of the present invention provides an information-processing apparatus comprising, a plurality of processing units operating according to an operation mode selected from a group consisting of a plurality of operation modes including first and second operation modes; a memory unit operating according to the selected operation mode, a mode-controlling unit; an interface unit, and a local data bus, wherein each of the plurality of processing units comprises: a calculation unit, a local memory, and a selector.

The memory unit comprises, a memory, and a selector. According to an external instruction, the mode-controlling unit selects an operation mode to switch each of selectors of the plurality of processing units and the selector of the memory unit. When the first operation mode is selected, the selector of each of the plurality of processing units connects the local memory to the calculation unit of each of the plurality of processing units, and the selector of the memory unit connects the memory of the memory unit to the local bus, and the plurality of processing units perform predetermined processes, respectively. When the second operation mode is selected, the selector of each of the plurality of processing units connects the local memory to the interface unit, and the selector of the memory unit connects the memory of the memory unit to the interface unit, and data is transmitted between a memory block and the outside of the apparatus via the interface unit, the memory block being composed of the local memory of each of the plurality of processing units and the memory of the memory unit.

With this structure, according to the instruction from the outside, an operating mode of the information-processing apparatus is selected to a "memory mode", the local memories of the plurality of processing units and the memory of the memory unit can be utilized as an independent memory accessible from the outside. Therefore, the information-processing apparatus can be utilized as a memory device by easy instruction operations.

A fourth aspect of the present invention provides an information-processing apparatus as defined in the third aspect, wherein each of the plurality of processing unit comprises a data line. The interface unit comprises: a selecting circuit operable to select the data line of each of the plurality of processing units by a predetermined number of bits, and an access-controlling circuit operable to control input/output of data to the plurality of processing units.

With this structure, even when bit width and address width of the local memories are different from each other, a bit-wise control allows the local memories of the plurality of processing units to be utilized as an independent memory accessible from the outside.

A fifth aspect of the present invention provides an information-processing apparatus as defined in the third aspect, wherein the interface unit comprises a control signal-converting unit operable to convert signals between one format and another format.

With this structure, even when the local memories are composed of various kinds of memories, the control signal-converting unit allows the local memories of the plurality of processing units to be utilized as an independent memory accessible from the outside. Herein, since a programmer do not have to take the types of the local memories into consideration, the information-processing apparatus can be handled more easily than the prior art.

A sixth aspect of the present invention provides an information-processing apparatus as defined in the third aspect, wherein at least a part of the memory unit is provided outside.

With this structure, since the memory unit may be provided outside a package of the information-processing unit, it is easy to enlarge capacity of the memory unit. Therefore, the information-processing unit can be used with huge amount of memory space, in a case where the plurality of processing units perform predetermined processes and in a case where the plurality of processing units operates as a part of a memory device.

A seventh aspect of the present invention provides an information-processing apparatus defined in the third aspect, wherein the predetermined processes are selected from a group consisting of a compression/expansion process of audio signals, a motion-estimating process, a motion-compensating process, a DCT (discrete cosine transformation) process, an inverse DCT process, a quantization process, an inverse quantization process, a variable length-coding process, a variable length-decoding process, and a noise reduction process.

With this structure, an information-processing apparatus with multi-functions can be provided, while the local memories of the plurality of processing units and the memory of the memory unit can be utilized as an independent memory accessible from the outside.

An eighth aspect of the present invention provides an electronic equipment comprising an information-processing apparatus operating in a plurality of operation modes, the information-processing apparatus comprising a plurality of processing units, wherein, when one of the plurality of operation modes is selected, the plurality of processing units perform predetermined processes, respectively, and wherein, when the other of the plurality of operation modes is selected, the plurality of processing units respectively operate as an externally accessible memory device.

With this structure, since the information-processing apparatus operates not only as an information-processor but also as a memory device, a number of parts of the electric equipment can be reduced. Accordingly, mounting space and manufacture cost of the electric equipment can be lessened.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Embodiments of the present invention are now described with reference to the accompanying drawings. In the following embodiments, an image encoding/decoding LSI based on an MPEG encoding system is explained as an example.

First Embodiment

Figure 1:
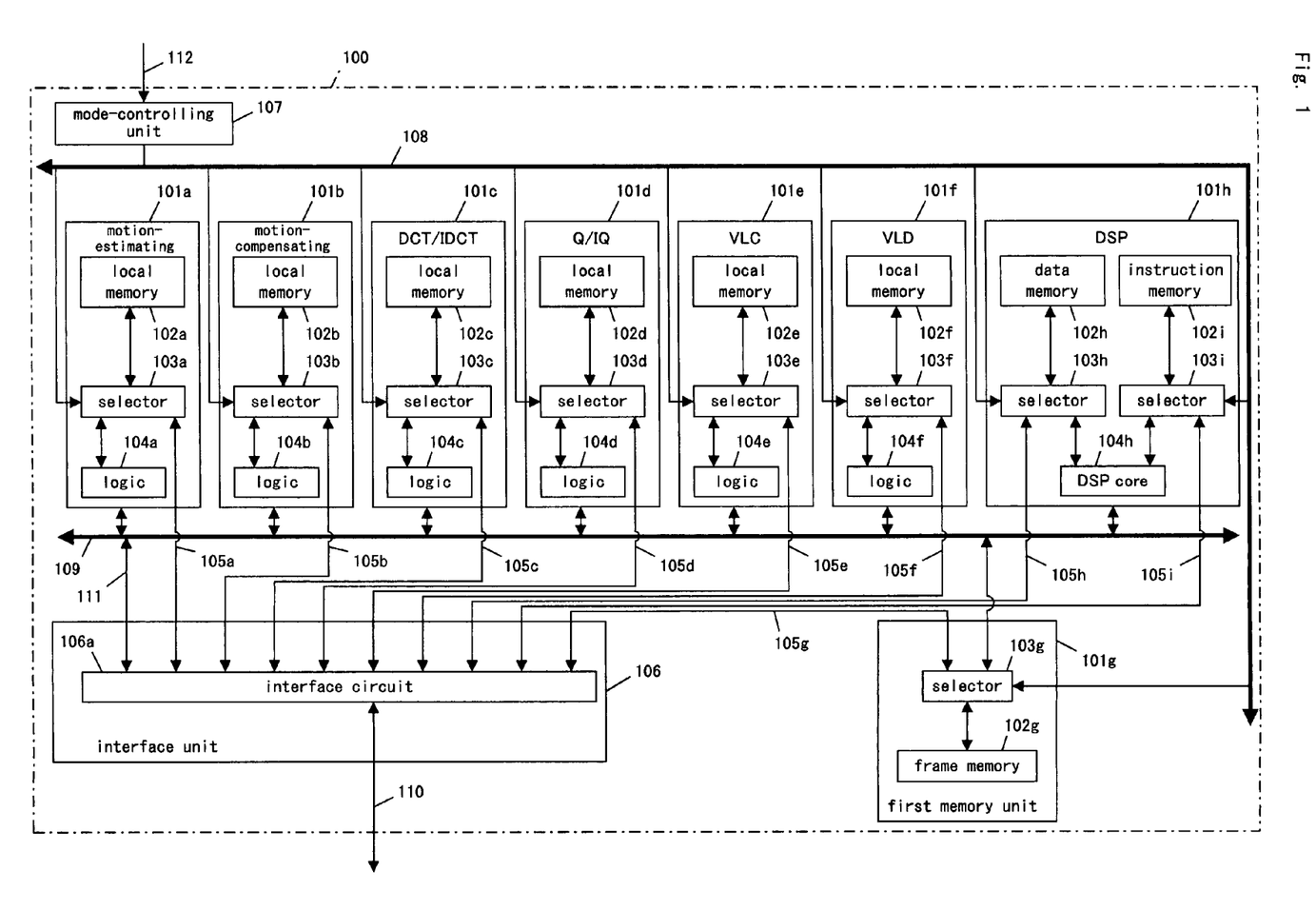
FIG. 1 is a block diagram of an information-processing apparatus in a first embodiment of the present invention.

FIG. 1 is the block diagram of an information-processing apparatus 100 in the first embodiment of the present invention.

The information-processing apparatus 100 of the present embodiment comprises, as a plurality of processing units, a motion detecting unit 101a (it is called "motion-detecting" for short in FIG. 1), a motion-compensating unit 101b (it is called "motion-compensating" for short in FIG. 1), a DCT/IDCT (Discrete Cosine Transformation/Inverse Discrete Cosine Transformation) unit 101c, a Q/IQ (Quantization/Inverse Quantization) unit 101d, a VLC (Variable Length Coding) unit 101e, a VLD (Variable Length Decoding) unit 101f, and a DSP (Digital Signal Processing) unit 101h. The information-processing apparatus 100 of the present invention further comprises a first memory unit 101g, an interface unit 106, a mode-controlling unit 107, a local control bus 108 and a local data bus 109.

The motion-detecting unit 101a possesses a local memory 102a, a selector 103a and a logic 104a that is a calculation unit, the motion-detecting unit 101b possesses a local memory 102b, a selector 103b, and a logic 104b that is a calculation unit, the DCT/IDCT unit 101c possesses a local memory 102c, a selector 103c and a logic 104c that is a calculation unit, the Q/IQ unit 101d possesses a local memory 102d, a selector 103d and a logic 104d that is a calculation unit, the VLC unit 101e possesses a local memory 102e, a selector 103e, and a logic 104e that is a calculation unit, and the VLD unit 101f possesses a local memory 102f, a selector 103f and a logic 104f that is a calculation unit.

The DSP unit 101h possesses a data memory 102h, an instruction memory 102i, a selector 103h, a selector 103i and a DSP core 104h that is a calculation unit.

The first memory unit 101g possesses a frame memory 102g and a selector 103g.

The interface unit 106 possesses an interface circuit 106a, is connected to the local data bus 109 via a data line 111, and is connected to the selectors 103a-103i of each processing unit via data buses 105a-105g.

The interface unit 106 is also connected to a system bus 110 in order to perform data transfer with the outside.

The local data bus 109 is connected to the interface unit 106 and the other processing units 101a-101h. Data transfer between the local memories 102a-102g and the frame memory 102g, and data transfer between the data memory 102h and the frame memory 102g are performed via the local data bus 109.

The local control bus 108 is connected to the mode-controlling unit 107 and the selectors 103a-103i.

In the following description, when there is no possibility of confusion, the processing units 101a-101f and 101h are collectively called as a processing unit 101. Similarly, the local memories 102a-102f are collectively called as a local memory 102, the selectors 103a-103i are collectively called as a selector 103, and the logics 104a-104f are collectively called as a logic 104.

The local memory 102 stores the data that is processed by each of the processing unit 101 in regular operation ("processing mode" that is described below).

The frame memory 102g, in regular operation, stores a moving picture before, during and after encoding is performed.

In regular operation, the data memory 102h stores data, which the DSP unit 101h uses for calculation.

The instruction memory 102i, in regular operation, stores an instruction, which the DSP unit 101h processes.

The logic 104 performs processing that is specified by each of the processing unit 101.

The greatest feature of the information-processing apparatus 100 of the present embodiment is two modes of operation. In other words, the information-processing apparatus 100 of the present embodiment can select the operation mode that is either a "processing mode" or a "memory mode" according to the instruction from the outside.

In the "processing mode", the DSP unit 101h and the processing unit 101 of the information-processing apparatus 100 perform encoding/decoding of the moving picture, using each of the local memory 102, the data memory 102h and the frame memory 102g.

In the "memory mode", all memories, which the information-processing apparatus 100 possesses, create memory space that is logically combined, and function as one independent memory that can be accessed from an external CPU. The details are explained later.

The mode-controlling unit 107 is a mode setting means possessing a setting register, which sets up the operation mode of the processing unit 101. When the mode-controlling unit 107 receives an instruction 112 from the outside, the mode-controlling unit 107 controls the selector 103 via the local control bus 108, and changes the operation mode of the processing unit 101 to the "processing mode" that performs moving picture process or the "memory mode" that functions as the external independent memory.

The data buses 105a-105g comprise a chip select signal, an enable signal, an address bus, a write data bus, and a read data bus.

The information-processing apparatus 100 communicates with the external CPU via the interface unit 106, and performs the data transfer.

The operation of the information-processing apparatus 100 of the present embodiment is explained in the cases of the "processing mode" and the "memory mode" in the following. First, the operation in the "processing mode" is explained.

The mode-controlling unit 107 receives the instruction 112 from the outside, sets the operation mode of the processing unit 101 to the "processing mode" that processes the moving picture, and encodes or decodes the moving picture.

The selectors 103a-103f connect respectively the local memories 102a-102f to the logics 104a-104f according to the setting of the "processing mode". The selector 103g also connects the frame memory 102g to the local data bus 109. The selector 103h connects the data memory 102h to the DSP core 104h, and the selector 103i connects the instruction memory 102i to the DSP core 104h.

The outline regarding the operation for encoding moving picture under the above-described setting of the "processing mode" is explained.

The DSP core 104h of the DSP unit 101h transfers the moving picture data, which is stored in the frame memory 102g, to the data memory 102h in order to perform the preprocessing of the moving picture data that is subjected for encoding. Then, the DSP core 104h executes the instruction that is stored in the instruction memory 102i, performs the preprocessing to the moving picture data that is transferred to the data memory 102h, and stores the data into the frame memory 102g again.

After the completion of the preprocessing, the DSP unit 101h transfers the image data and the reference image data after preprocessing, to the local memory 102a of the motion-detecting unit 101a from the frame memory 102g. The motion-detecting unit 101*a* performs motion-estimating process, and stores the difference image that is a difference between the present image and the reference image, and the motion vector in the local memory 102*a*. After completing the motion-estimating process, the motion-detecting unit 101*a* sends an ending notice to the DSP unit 101*h*.

When the DSP unit 101*h* receives the ending notice, the DSP unit 101*h* transfers the difference image data stored in the local memory 102*a* to the local memory 102*c* of the DCT/IDCT unit 101*c*. The DCT/IDCT unit 101*c* performs DCT (discrete cosine transformation) processing, and stores the DCT coefficient data after processing in the local memory 102*c*. The DCT/IDCT unit 101*c* sends an ending notice to the DSP unit 101*h* after the DCT processing is completed.

When the DSP unit 101*h* receives the ending notice, the DSP unit 101*h* transfers the DCT coefficient data stored in the local memory 102*c* to the local memory 102*d* of the Q/IQ unit 101*d*. The Q/IQ unit 101*d* performs quantization processing, and stores the quantization coefficient data after processing in the local memory 102*d*. The Q/IQ unit 101*d* sends an ending notice to the DSP unit 101*h* after the quantization processing is completed.

When the DSP unit 101*h* receives the ending notice, the DSP unit 101*h* transfers the quantization coefficient data stored in the local memory 102*d* to the local memory 102*e* of the VLC unit 101*e*. The VLC unit 101*e* performs variable length encoding processing, and stores the variable length encoding data after processing in the local memory 102*e*. The VLC unit 101*e* sends an ending notice to the DSP unit 101*h* after variable length encoding processing is completed.

When the DSP unit 101*h* receives the ending notice, the DSP unit 101*h* transfers variable length encoding data stored in the local memory 102*e* to the frame memory 102*g*. After all, a series of encoding process for the moving picture.

Data transfer between each memory in this case is performed via the local data bus 109.

The outline regarding the operation for decoding moving picture under the above-described setting of the "processing mode" is explained next.

The DSP unit 101*h* transfers the variable length encoded data subjected for decoding, which is stored in the frame memory 102*g*, to the local memory 102*f* of the VLD unit 101*f*. The VLD unit 101*f* performs the variable length decoding processing to the variable length encoded data that is subjected for decoding, and stores the quantization coefficient data after processing in the local memory 102*f*. The VLD unit 101*f* sends an ending notice to the DSP unit 101*h* after the variable length decoding processing is completed.

When the DSP unit 101*h* receives the ending notice, the DSP unit 101*h* transfers the quantization coefficient data stored in the local memory 102*f* to the local memory 102*d* of the Q/IQ unit 101*d*. The Q/IQ unit 101*d* performs the inverse quantization process to the quantization coefficient data, and stores the DCT coefficient data after processing in the local memory 102*d*. The Q/IQ unit 101*d* sends an ending notice to the DSP unit 101*h* after the inverse quantization process is completed.

When the DSP unit 101*h* receives the ending notice, the DSP unit 101*h* transfers the DCT coefficient data stored in the local memory 102*d* to the local memory 102*c* of the DCT/IDCT unit 101*c*. The DCT/IDCT unit 101*c* performs the IDCT (inverse discrete cosine transformation) processing to the DCT coefficient data, and stores the difference image data after processing in the local memory 102*c*. The DCT/IDCT unit 101*c* sends an ending notice to the DSP unit 101*h*, after the IDCT processing is completed.

When the DSP unit 101*h* receives the ending notice, the DSP unit 101*h* transfers the difference image data and the reference image data stored in the local memory 102*c* to the local memory 102*b* of the motion-compensating unit 101*b*. The motion-compensating unit 101*b* performs the motion-compensating process using the difference image data and the reference image data, and stores the image data after processing in the local memory 102*b*. The motion-compensating unit 101*b* sends an ending notice to the DSP unit 101*h*, after the motion-compensating process is completed.

When the DSP unit 101*h* receives the ending notice, the DSP unit 101*h* transfers the image data stored in the local memory 102*b* to the frame memory 102*g*. This completes a series of decoding process for the moving picture.

Data transfer between each memory in this case is performed via the local data bus 109.

Operation for the information-processing apparatus 100 of the present embodiment in the "memory mode" is next explained.

After the mode-controlling unit 107 receives the instruction 112 from the outside, the mode-controlling 107 sets the operation mode of the processing unit 101 to the "memory mode" that functions as the externally-accessible independent memory.

The selectors 103*a*-103*f* connect each local memory 102*a*-102*f* to the interface circuit 106*a* of the interface unit 106 with the setting of "memory mode". The selector 103*g* connects the frame memory 102*g* to the interface circuit 106*a*. The selector 103*h* connects the data memory 102*h* to the interface circuit 106*a*, and the selector 103*i* connects the instruction memory 102*i* to the interface circuit 106*a*.

After the above-mentioned setting, when the external CPU performs the write access to the interface unit 106 via the system bus 110, the inputted address is decoded in the interface unit 106 and specified memory is accessed.

Figure 6:
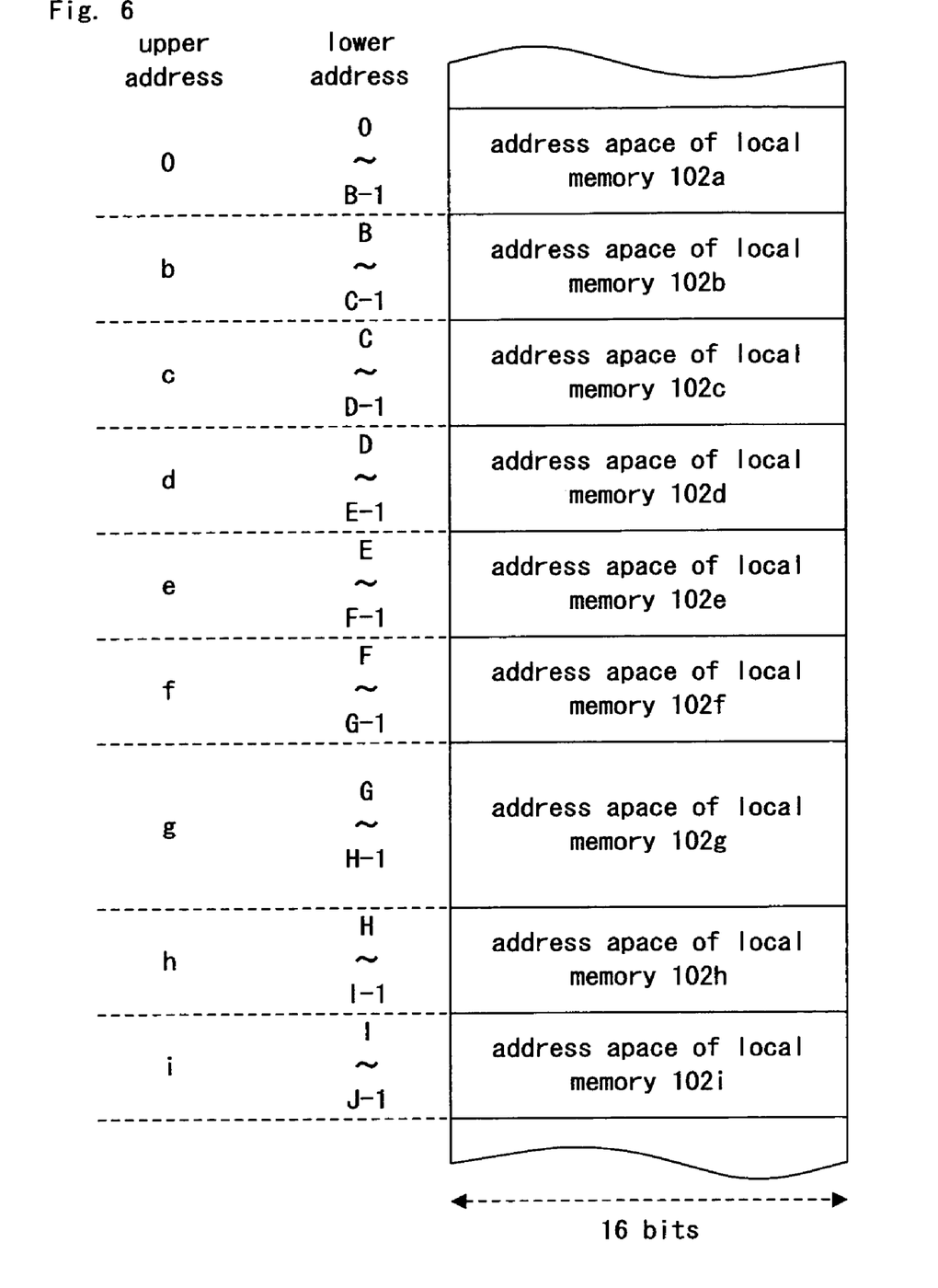
FIG. 6 is a memory map of the information-processing apparatus in a "memory mode" in the first embodiment of the present invention.

FIG. 6 is the memory map in the "memory mode" of the information-processing apparatus 100 in the first embodiment of the present invention. As shown in FIG. 6, in the information-processing apparatus 100 of the present embodiment, an upper address specifies which memory is to be chosen, and a lower address specifies the address within the specified memory.

The interface unit 106 shown in FIG. 1 decodes the inputted address, makes a chip select signal and an enable signal valid for the data bus 105*a* when a decoded result of the upper address is "0", and accesses to the local memory 102*a*. The interface unit 106 further inputs the lower address, and directly outputs the write data inputted by the system bus 110 into the local memory 102*a*. The write access is performed to the local memory 102 as mentioned above.

In the case of a read access, the chip select signal, the enable signal and the address bus function in the same way as in the case of the write access. The interface unit 106 selects the read data, which is read out from the local memory 102*a* and is acquired via the data bus 105*a*, and outputs the read data into the system bus 110.

Similarly, when the decoded result of the upper address of the address inputted from the system bus 110 is "b", the data bus 105*b* becomes valid and the local memory 102*b* is accessed.

In this way, the inputted address is decoded, the data bus corresponding to the upper address is selected within the data bus 105, and the memory corresponding to the data bus is selected. At this time, not only the local memories 102*a*-102*f*, but also the frame memory 102*g*, the data memory 102h and the instruction memory 102i become accessible, and a large independent memory can be formed as a whole.

According to the structure of the present embodiment, the information-processing apparatus can be efficiently used in multiple ways by setting the operation mode of the information-processing apparatus 100 to the "processing mode" and the "memory mode". Thus, when the operation mode is set as the "processing mode", the information-processing apparatus 100 performs regular image signal processing using the memories that the information-processing apparatus 100 possesses, and when the operation mode is set as the "memory mode", the memories that the information-processing apparatus 100 possesses are logically combined and can save the data from the outside as one independent memory. As the result, efficiency of the processing as the independent memory can be improved, and the resources can be effectively used.

Second Embodiment

Figure 2:
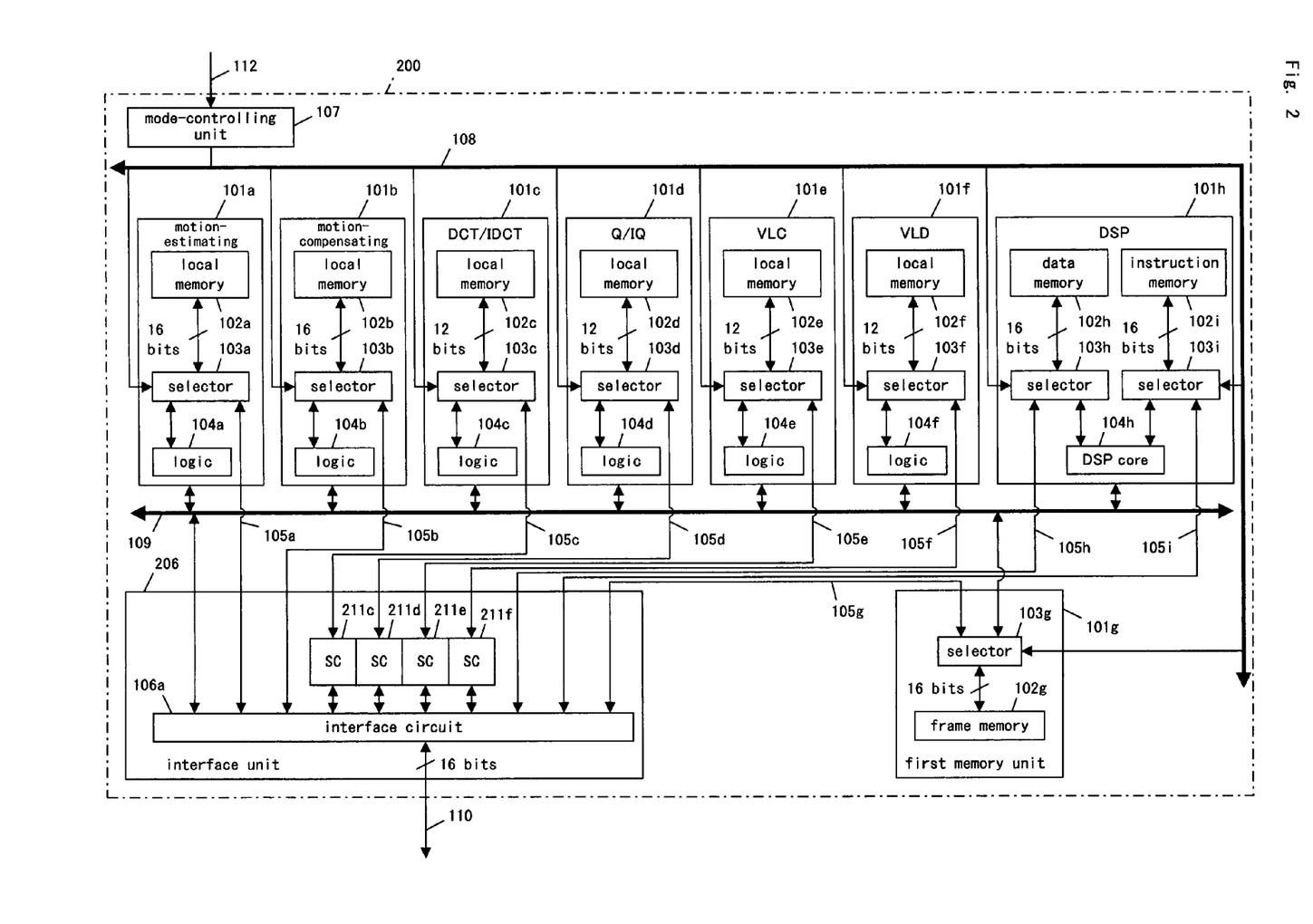
FIG. 2 is a block diagram of an information-processing apparatus in a second embodiment of the present invention.

FIG. 2 is the block diagram of an information-processing apparatus 200 in a second embodiment of the present invention. In FIG. 2, descriptions are omitted by giving the same symbols regarding the same components as in FIG. 1.

A case where the information-processing apparatus 200 of the present embodiment is applied as an image encoding/decoding LSI based on a MPEG encoding system is explained.

As shown in FIG. 2, in the information-processing apparatus 200 of the present embodiment, the local memory 102a of the motion-detecting unit 101a, the local memory 102b of the motion-compensating unit 101b, the data memory 102h and the instruction memory 102i of the DSP unit 101h, and the frame memory 102g of the first memory unit 101g possess the bit width of 16 bits, and the local memories 103c-103f of the other processing unit 101c-101f possess the bit width of 12 bits. In order to cope with the difference of bit width between the memories, the information-processing apparatus 200 of the present embodiment comprises selecting circuits 211c-211f for the local memories 103c-103f with the 12 bit width. The selecting circuits 211c-211f are bit selecting circuits that selects specified bits only, and the operation is described later.

The information-processing apparatus 200 can set the operation mode as the "processing mode" and the "memory mode" just like the information-processing apparatus 100 of the first embodiment of the present invention. When the operation mode is set as the "processing mode", the operation of the information-processing apparatus 200 is the same as that of the information-processing apparatus 100. The encoding and decoding of the moving picture for the present embodiment are same as those explained in the first embodiment of the present invention, therefore, the explanation is omitted.

The operation of the information-processing apparatus 200 of the present embodiment is explained in the following, when the operation mode is set to the "memory mode".

The setting of the mode-controlling unit 107 and the selector 103, and the connection between each memory 102a-102i and an interface unit 206 are same as those explained in the first embodiment of the present invention. However, the local memories 103c-103f are connected to the selection circuits 211c-211f of the interface unit 206.

After the setting of the "memory mode" is done, when the external CPU performs the write access via the system bus 110, the inputted address is decoded in the interface unit 206 and the specified memory is accessed.

Figure 7:
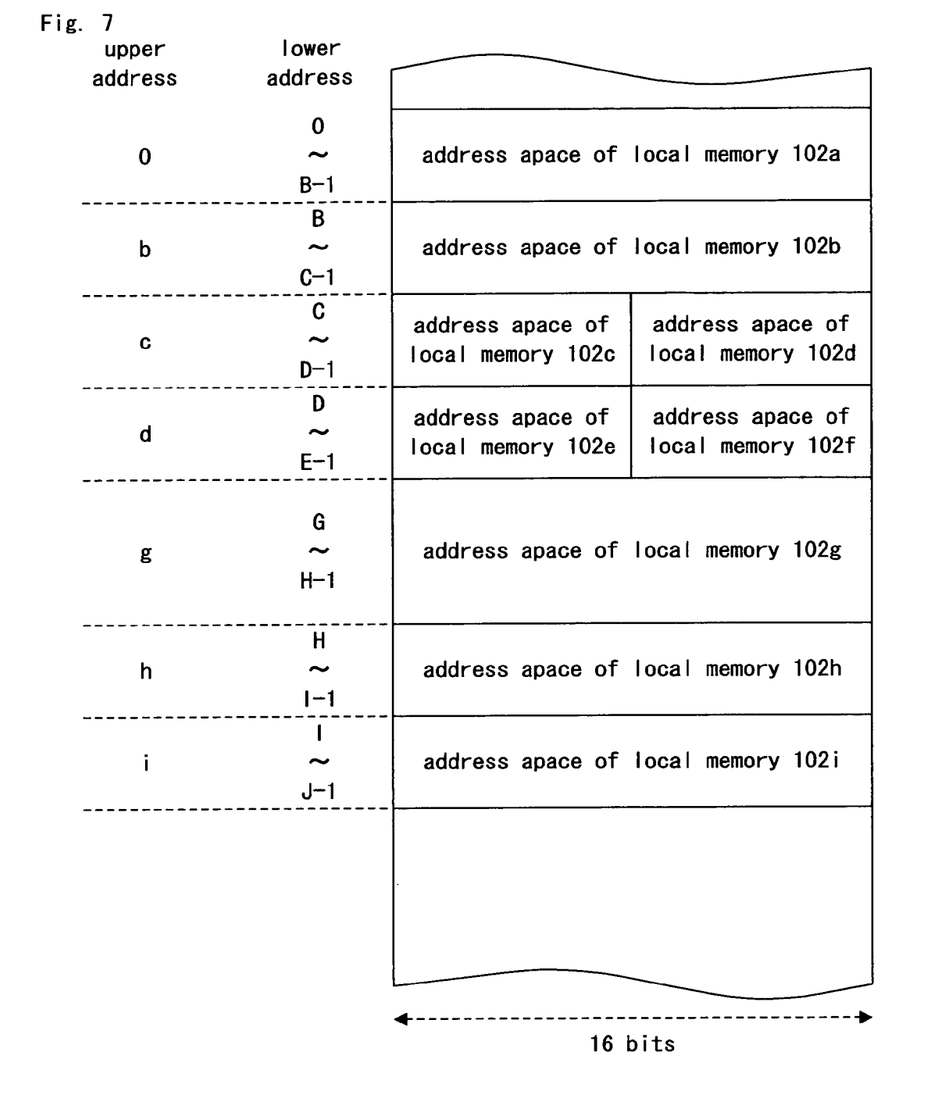
FIG. 7 is a memory map of the information-processing apparatus in the "memory mode" in the second embodiment of the present invention.

FIG. 7 is the memory map in the "memory mode" of the information-processing apparatus in the second embodiment of the present invention. As shown in FIG. 7, the address space of the local memory 102c and the address space of the local memory 102d are combined, and the combined space forms address space that is classified by an upper address "c". In a similar way, the address space of the local memory 102e and the address space of the local memory 102f are combined, and the combined space forms address space that is classified by an upper address "d". Address space that should be classified by upper addresses "e" or "f" does not exist.

The interface unit 106 decodes the inputted address, selects the data bus corresponding to the upper address from the data bus 105, and then selects the memory corresponding to the data bus. When the decoded result of the upper address is "0", "b", "g", "h" or "i", a memory corresponding to each upper address is selected as in the explanation of the first embodiment of the present invention.

A case where the decoded result of the upper address is "c" is explained referring to FIG. 2. In the write access, when the decoded result of the upper address is "c", the selecting circuit 211c selects upper 8 bits within the input data of the 16 bits of the system bus 110, and writes down in the local memory 102d in a right-aligned manner via the data bus 105d. Simultaneously, the selecting circuit 211d selects lower 8 bits within the input data of the 16 bits, and writes down in the local memory 102d in a right-aligned manner via the data bus 105d. In this way, the 16-bits data is stored in the address space of the local memory 102c and the local memory 102d that are logically combined.

In the read access in a case where the upper address is "c", the selecting circuits 211c and 211d select the data of lower 8 bits within the read data of local memories 102c and 102d, and give the data to the interface circuit 106a. The interface circuit 106a inputs the 8-bits-data read out from the local memory 102c into the upper 8 bits of the system bus 110, and inputs the 8-bits-data read out from the local memory 102d to the lower 8 bits of the system bus 110. The 16-bits read operation to the upper address "c" is performed in the way of the operation mentioned above.

When the decoded result of the upper address within the address inputted by the system bus 110 is "d", the data will be inputted to and outputted from the local memories 102e and 102f in a similar way as the decoded result is "c".

In the memory map shown in FIG. 7, the address widths of the local memories 102e and 102f are the same, but the address widths are not necessary to be equal.

Figure 8A:
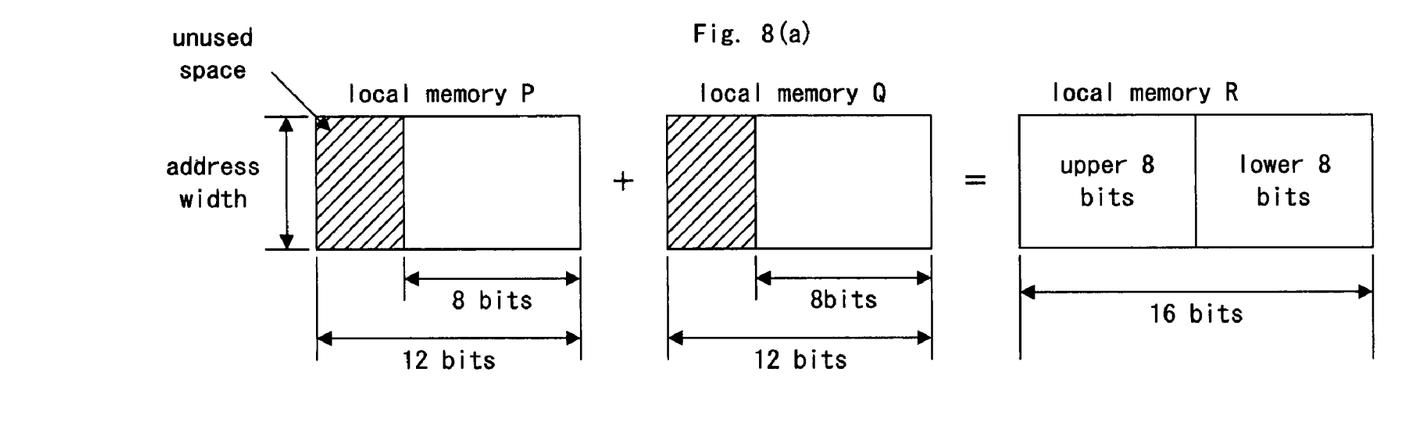
FIG. 8(a) and FIG. 8(b) are explanatory drawings of memory combination of the information-processing apparatus in the second embodiment of the present invention (in a case of different address widths)

FIG. 8(a) is the explanatory drawing of the memory combination in a case of equal address width for the information-processing apparatus 200 in the second embodiment of the present invention. In the example, local memories P and Q have an equal address width and an equal bit width of 12 bits. In this case, a virtual local memory R is created by combining the local memories P and Q logically. The upper 8 bits of the virtual local memory R is the lower 8 bits of the local memory P, and the lower 8 bits of the virtual local memory R is the lower 8 bits of the local memory Q. The slashed regions are not used in the FIG. 8(a).

Figure 8B:
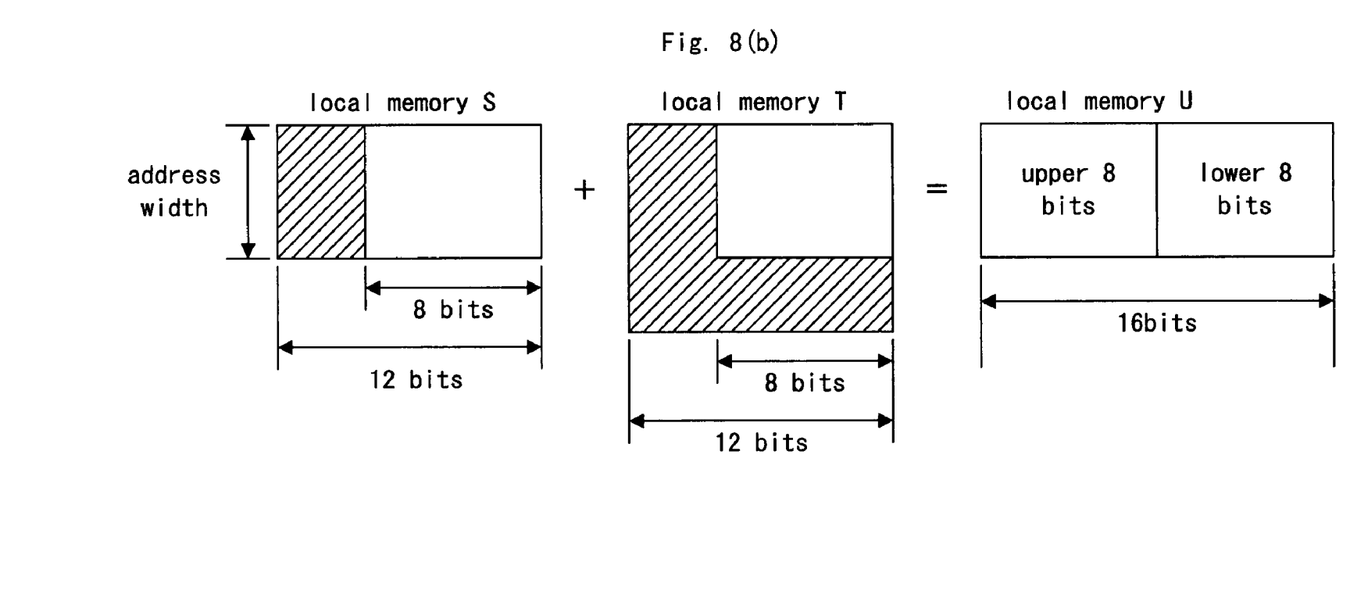

FIG. 8(b) is the explanatory drawing of the memory combination in a case of different address width for the information-processing apparatus 200 in the second embodiment of the present invention. In the example, local memories S and T have an equal bit width of 12 bits but a different address width. The address width of a virtual local memory U, which is created by logical combination of the local memories S and T, is adjusted to the address width of the local memory S with the smaller address width. The upper 8 bits of the virtual local memory U is the lower 8 bits of the local memory S, and the lower 8 bits of the virtual local memory U is the lower 8 bits of the local memory T. The slashed regions are not used in the FIG. 8(b).

In this way, even when the information-processing apparatus 200 includes local memories whose address width is different, each of the local memories can be logically combined to operate as an independent memory and to save external data, by introducing the selecting circuits 211c-211f that perform selection per bit and performing the access control in the interface 106a.

Thus, according to the structure of the present embodiment, a plurality of memories, which have different bit widths and address widths, can be controlled in terms of bit and address in order to transfer the external data easily. Consequently, the structure of the present embodiment can provide the external CPU with function as a memory that has continuous address space with a fixed bit width, thereby efficiency of data transfer to the memory can be improved.

Third Embodiment

Figure 3:
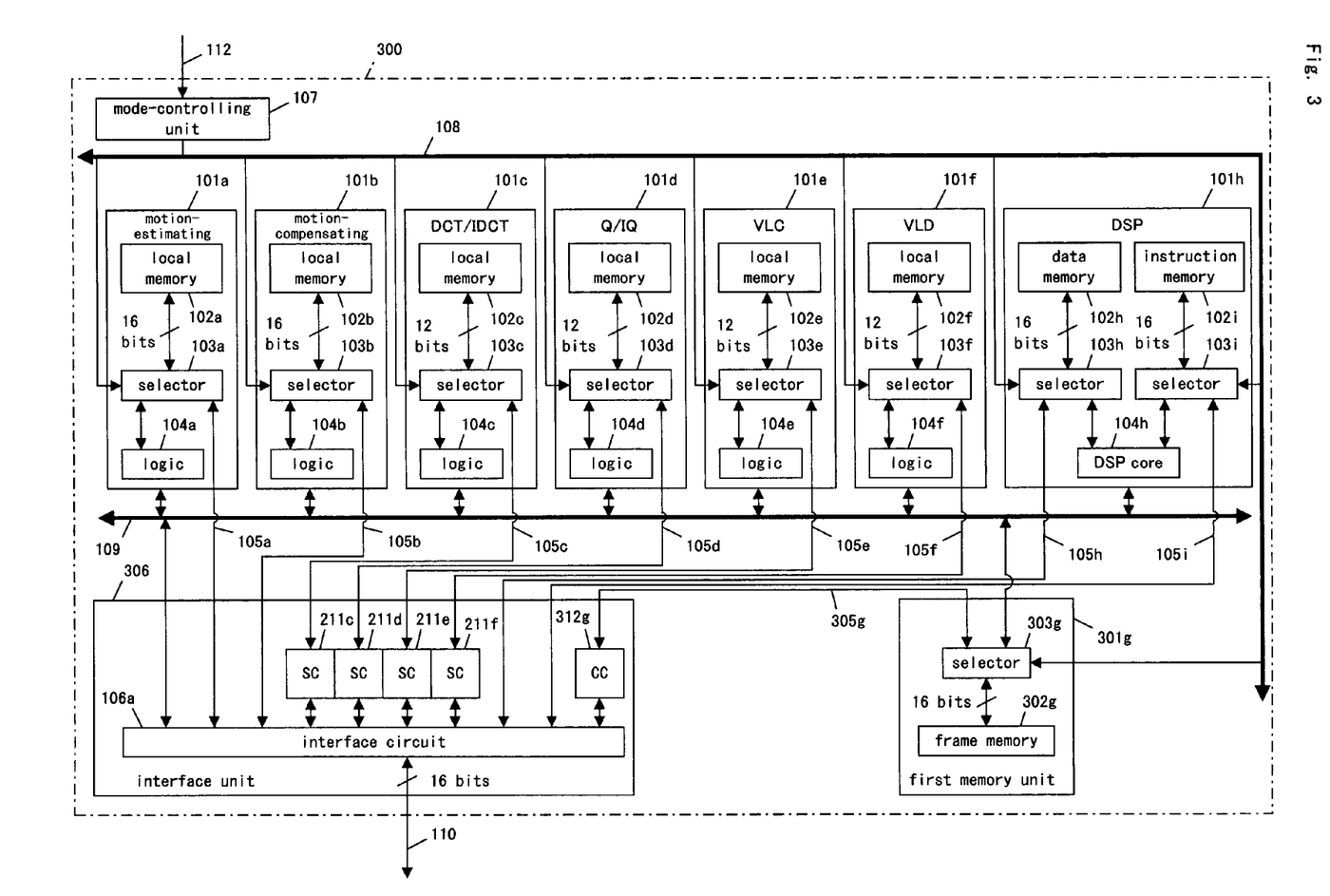
FIG. 3 is a block diagram of an information-processing apparatus in a third embodiment of the present invention.

FIG. 3 is a block diagram of an information process device 300 according to a third embodiment of the present invention. In FIG. 3, description of the same components as in FIG. 2 is omitted by attaching the same symbols.

As shown in FIG. 3, in the information process device 300 of the present embodiment, a first memory unit 301g possesses a mass frame memory 302g constructed by DRAM, and an interface unit 306 possesses a converting circuits 312g for controlling the frame memory 302g of the DRAM construction. Other constructions are the same as those of the information process device 200 in the second embodiment of the present invention.

Generally, although SRAM is used for a memory inside LSI, DRAM is used when a mass memory is needed. The information process device 300 of the present embodiment comprises the mass frame memory 302g of 16 bit width constructed by DRAM in order to perform efficiently image processing which deals with a lot of data. SRAM is used for other memories. Consequently, the information process device 300 possesses different kinds of memories inside the information process device 300, so that new measure is required. That is, when the external CPU accesses to the frame memory 302g via the interface unit 306, the converting circuit 312g in the interface unit 306 converts access control signals so that the external CPU can use the same access control signal as for the other memories.

The information process device 300 of the present embodiment can set an operation mode to an "operation mode" and a "memory mode" like the information process device 100 of the first embodiment of the present invention. Operation of the information process device 300 when the operation mode is set to the "operation mode" is the same as the operation of the information process device 100. Encoding and decoding of a moving picture in the present embodiment are the same as what are described in the first embodiment of the present invention, therefore, the description thereof is omitted.

With reference to FIG. 3, operation of the information process device 300 of the present embodiment when an operation mode is set to the "memory mode" is described hereinafter.

Setting of the mode-controlling unit 107 and the selectors 103a to 103f, 103h, and 103i, and resulting connection between the interface unit 306 and each of the memory 120a to 120f, the data memory 102h, the instruction memory 102i in the "memory mode" is the same as those described in the second embodiment of the present invention.

In the first memory unit 301g, when the mode-controlling unit 107 is set to the "memory mode," in response to the control, a selector 303g connects the frame memory 302g to the converting circuit 312g of the interface unit 306.

After setting of the "memory mode," when the external CPU performs write access to the interface unit 306 via the system bus 110, an inputted address is decoded in the interface unit 306 and the specified memory is accessed.

An Operation that the external CPU accesses to local memory 102a to 102f, the data memory 102h and the instruction memory 102i via the interface unit 306 is the same as the case that is described in the second embodiment of the present invention, including the case where the memories possess different bit widths. Therefore, further description is omitted.

The external CPU accesses to the frame memory 302g via the interface unit 306 after converting a SRAM access control signal into a DRAM access control signal by the converting circuit 312g.

The memory map in the "memory mode" of the information process device 300 of the present embodiment is the same as what reads "address space of the frame memory 102g" shown in FIG. 7 as "address space of the frame memory 302g". However, "the address space of the frame memory 302g" is larger in scale compared with "the address space of the frame memory 102g".

Thus, in the information process device 300 of the present embodiment external access can be made to the memories as one independent memory, without being conscious of the difference in kind and type of the memories, by installing selecting circuits 211c to 211f and the converting circuit 312g.

As described above, according to the construction of the present embodiment, when moving-picture process is not performed, the information process device 300 can as a large-capacity memory device, other than function according to the MPG-4 moving picture encoding/decoding process. For example, in a system using the information process device 300 of the present embodiment, when performing consecutive shots of a still image, the information process device 300 can be used as a memory device in order to increase the number of frames of the consecutive shots. In this case, since it is not necessary to newly add memories in order to increase the number of frames of the consecutive-shots, reduction in number of parts, installation area, and cost become possible for the system.

Fourth Embodiment

Figure 4:
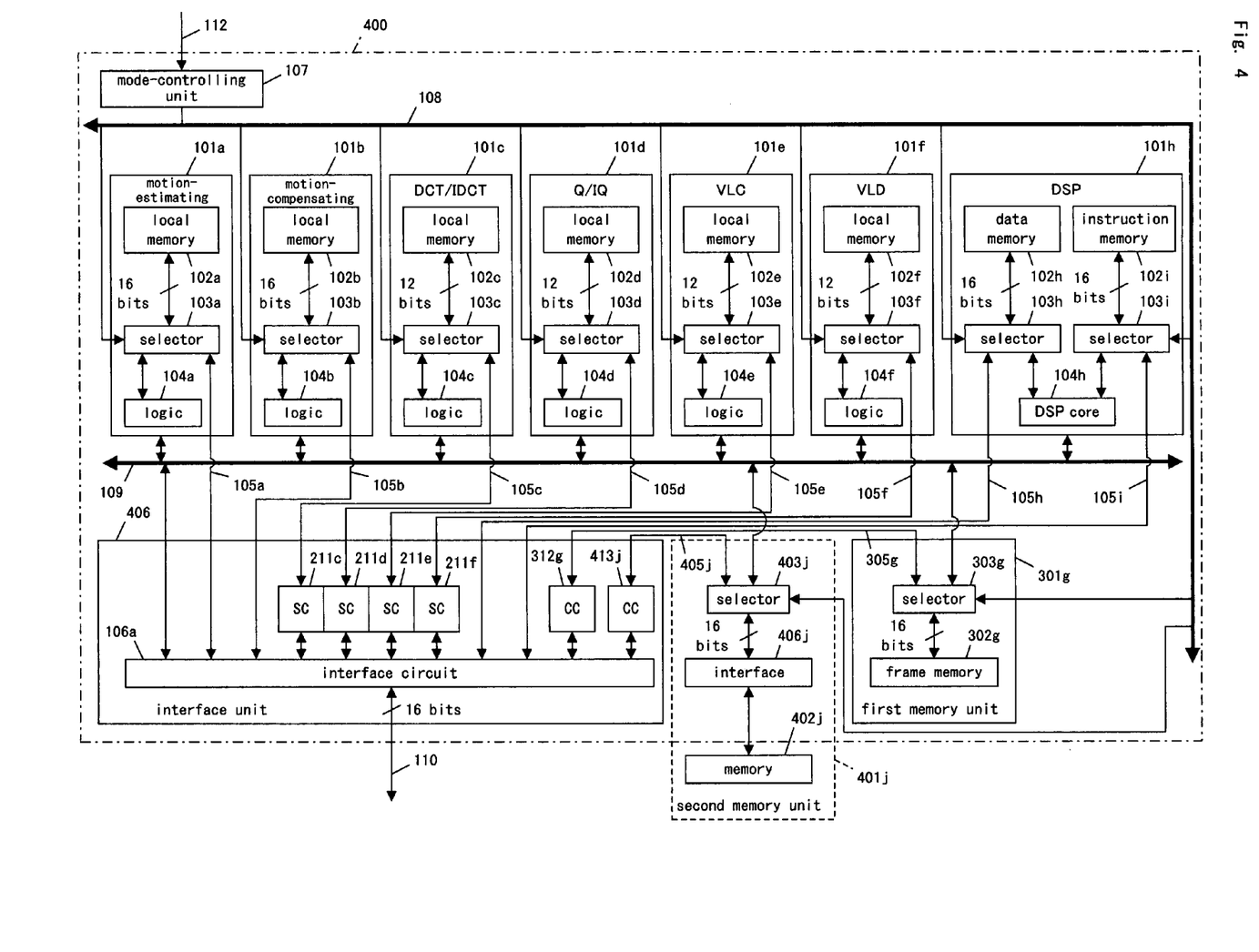
FIG. 4 is a block diagram of an information-processing apparatus in a fourth embodiment of the present invention.

FIG. 4 is a block diagram of an information process device 400 according to a fourth embodiment of the present invention. Regarding FIG. 4, a description of the components which are shown in FIG. 3 is omitted.

As shown in FIG. 4, the information process device 400 of the present embodiment comprises a second memory unit 401j which possesses a memory 402j, a selector 403j, and an interface 406j. The memory 402j is externally attached. An interface unit 406 possesses a converting circuit 413j for controlling the above-mentioned external memory 402j. The other constructions of the information process device 400 are the same as those of the information process device 300 of the third embodiment of the present invention.

In the present embodiment, the external memory 402j is constructed by SDRAM and the interface 406j is a converting circuit for SDRAM.

The selector 403j is connected with the local control bus 108 like the selector 303g, and controlled by the mode-controlling unit 107. The selector 403j connects the memory 402j to the local data bus 109 or to the interface unit 406.

The information process device 400 of the present embodiment can set an operation mode to the "operation mode" and the "memory mode" like the information process device 100 of the first embodiment of the present invention.

When the operation mode is set to the "operation mode", the information process device 400 can use the first memory unit 301g with a large capacity and the second memory unit 401j with a further larger capacity as frame memories.

In the "operation mode", the selector 403j connects the memory 402j to the local data bus 109 via the interface 406j by control of the mode-controlling unit 107. Thus, operation of the information process device 400 in the "operation mode" is the same as the operation of the information process device 100 of the first embodiment of the present invention, except that the second memory unit 401j is added in parallel to the first memory unit 301g. Encoding and decoding of a moving picture in the present embodiment are the same as what is described in the first embodiment of the present invention, therefore further description is omitted.

With reference to FIG. 4, operation of the information process device 400 of the present embodiment in the "memory mode" is described hereinafter.

Setting of the mode-controlling unit 107 and the selectors 103a to 103i, and resulting connection between the interface unit 406 and each of the memories 102a to 102f, the frame memory 302g, the data memory 102h, and the instruction memory 102i in the "memory mode" are the same as those described in the third embodiment of the present invention.

In the "memory mode", the selector 403j connects the memory 402j to the converting circuit 413j via a data bus 405j by control of the mode-controlling unit 107. The converting circuit 413j converts a SRAM access control signal into a SDRAM access control signal. Thereby, the memory 402j, which comprises external SDRAM, can be accessed from the external CPU, without being conscious of the kind of the memory.

Thus, according to the structure of the present embodiment, the information process device 400 in processing of a moving picture of the "operation mode" possesses larger frame memory as compared with the third embodiment of the present invention. The information process device 400 can also be used as a memory device with a larger capacity in the "memory mode", as compared with the third embodiment of the present invention. For example, in a system using the information process device 400 of the present embodiment, when performing consecutive shots of a still image, the number of frames of consecutive shots can be further increased. For this reason, since it is not necessary to newly add memories in order to increase the number of frames of the consecutive-shots, reduction in number of parts, installation area, and cost become possible for the system.

Fifth Embodiment

Figure 5:
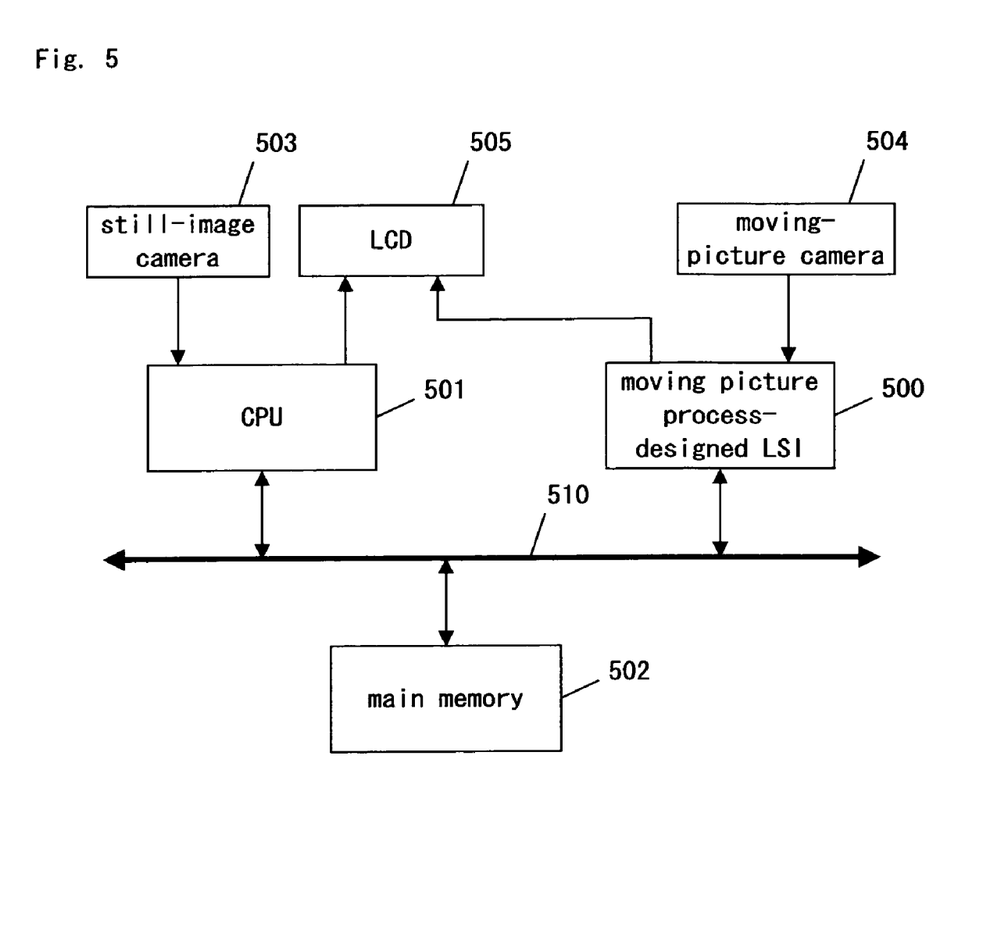
FIG. 5 is a block diagram of an information-processing system in a fifth embodiment of the present invention.

FIG. 5 is a block diagram of the information process system according to a fifth embodiment of the present invention. The information process system of the present embodiment deals with the so-called third generation cellular phone. The information process system comprises a system bus 510, a moving picture process-designed LSI 500, a CPU501, a main memory 502, a still-image camera 503, a moving-picture camera 504, and a LCD (liquid crystal display) 505. The moving picture process-designed LSI 500 corresponds to the information process devices 100 to 400 in the first embodiment to the fourth embodiment of the present invention, and the system bus 510 corresponds to the system bus 110.

With reference to FIG. 5, the moving-picture process method in the information process system of the present embodiment is described hereinafter.

First, the encoding is now described. By an instruction from the CPU501, a moving picture that the moving-picture camera 504 has shot is inputted into the moving picture process-designed LSI 500. For example, when using the information process device 100 shown in FIG. 1 as the moving picture process-designed LSI 500, a moving picture is inputted from a system bus 110 into the interface unit 106 and is stored in the frame memory 102g in the information process device 100 in FIG. 1. The subsequent encoding of moving pictures is as described in the first embodiment of the present invention.

As already described, the encoding is performed at high speed by using the special purpose process blocks. When the amount of a generated, encoded bit stream reaches given quantity, the moving picture process-designed LSI 500 interrupts the CPU501 to transmit the encoded bit stream to the main memory 502. The CPU501 transmits the encoded bit stream to the main memory 502 from the moving picture process-designed LSI 500 by the given quantity when interruption starts. The encoding of the moving picture is completed by repeating a series of the above operation.

The decoding is now described. The CPU501 instructs decoding to the moving picture process-designed LSI 500, and transmits an encoded bit stream to the moving picture process-designed LSI 500. For example, when using the information process device 100 shown in FIG. 1 as the moving picture process-designed LSI 500, the encoded bit stream is inputted from the system bus 110 into the interface unit 106 and is stored in the frame memory 102g in the information process device 100 in FIG. 1. The subsequent decoding of the moving pictures is as described in the first embodiment of the present invention.

In FIG. 5, the decoded image is transmitted to a LCD505 from the moving picture process-designed LSI 500, and a moving picture is displayed. When encoded bit streams are run short in the moving picture process-designed LSI 500, the moving picture process-designed LSI 500 applies request interruption of the encoded bit stream to the CPU501 at any time. The decoding of the moving picture is performed by repeating a series of the above operation.

Next, the encoding of a still image is described.

The information process system of the present embodiment comprises the still-image camera 503 in addition to the moving-picture camera 504. The still image shot by the still-image camera 503 is stored in the main memory 502 at any time. Then, a composed image with graphics data, such as time and a remaining capacity of a battery is made, and displayed on the LCD505.

The encoding of a still image is performed when one switch of an information process system is pressed. (The switch is not shown in FIG. 5. It is like a shutter button of a cellular-phone terminal.) When the switch is pressed, interruption goes into the CPU501 and the CPU501 transmits, as an interruption task, the still-image data in the main memory 502 to an area in the main memory 502 which is used in encoding of the still image. The transmitted still-image data is encoded by the CPU501 using algorithms, such as a JPEG (Joint Picture Experts Group) method.

When shooting still images consecutively and encoding the still images of consecutive frames within a short time, the encoding by the CPU501 takes time. Therefore, it is necessary to store several frames of the still images to be encoded to the main memory 502 beforehand.

In this case, although the number of frames which can be encoded is limited because of the capacity of the main memory 502, the moving picture process-designed LSI 500 does not perform image process while the still-image is processed, therefore by setting to the "memory mode," the local memories can be used as a complementary memory of the main memory 502. Thereby, the number of frames of the consecutively-shot still-images can be greatly increased.

Thus, when the information process devices 100 to 400 according to the first embodiment to the fourth embodiment of the present invention are used as the moving picture process-designed LSI 500 of the present embodiment, the information process devices 100 to 400 can be used as the complementary memory in performing the still-image processing, and the number of frames of the consecutively-shot still-images can be increased further. For this reason, it is not necessary to newly add memories in order to increase the number of frames of the consecutively-shot still-images. Thereby, reduction in number of parts, installation area, and cost become possible for the system.

As mentioned above, the information process devices 100 to 400 of the present invention possess the "operation mode" which processes the moving picture, and the "memory mode" which functions as one independent memory, and demonstrate the effect to the multi-functionalization and the effective use of resources. However, function except the "operation mode" is not limited only to the above-mentioned "memory mode," but may be utilized as a calculating circuit such as filter processing.

In the embodiments of the present invention mentioned above, the image encoding/decoding LSI according to an MPEG encoding method has been described as an example. However, each processing unit of the present invention may perform other processing than the MPEG encoding/decoding. In short, various applications are possible unless it deviates from the meaning of the present invention.

The present invention can provide an information process device comprising a memory unit and a plurality of processing units which perform specific processing, and can operate as a memory device which can be accessed directly from the outside by changing the operation mode. Consequently, the multi-functionalization of the information process device and the effective use of resources are attained.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An information-processing apparatus comprising:
   a plurality of processing units;
   an interface unit operable to interface each of said plurality of processing units to outside said information-processing apparatus; and
   a mode-controlling unit operable to select either a first operation mode or a second operation mode;
   each of said plurality of processing units comprising:
      a calculation unit operable to calculate according to a predetermined calculation;
      a local memory; and
      a first selector operable to:
         connect said calculation unit to said local memory when said mode-controlling unit selects the first operation mode; and
         connect said local memory to said interface unit when said mode-controlling unit selects the second operation mode, so as to allow said local memories of said plurality of processing units to be collectively accessed from the outside via said interface unit.

2. The information-processing apparatus as defined in claim 1 further comprising:
   a memory unit operable to be mutually accessed by each of said plurality of processing units, said memory unit comprising:
      a memory; and
      a second selector operable to:
         connect said memory of said memory unit to each of said plurality of processing units when said mode-controlling unit selects the first operation mode; and
         connect said memory of said memory unit to said interface unit when said mode-controlling unit selects the second operation mode, so as to allow said memory of said memory unit to be accessed from the outside via said interface unit.

3. The information-processing apparatus as defined in claim 1, wherein said interface unit comprises a selecting circuit operable to select a predetermined number of bits from a number of bits on a data line of each of said plurality of processing units.

4. The information-processing apparatus as defined in claim 1, wherein said interface unit comprises an access-controlling circuit operable to control an input of data to said local memory of each of said plurality of processing units, and operable to control an output of data from said local memory of each of said plurality of processing units.

5. The information-processing apparatus as defined in claim 1 wherein each of said plurality of processing units is operable to execute at least one of:
   a compression/expansion process of audio signals;
   a motion-estimation process;
   a motion-compensating process;
   a DCT process;
   an inverse DCT process;
   a quantization process;
   an inverse quantization process;
   a variable length-coding process;
   a variable length-decoding process; and
   a noise reduction process.

6. Electronic equipment comprising an information-processing apparatus, said information-processing apparatus comprising:
   a plurality of processing units;
   an interface unit operable to interface each of said plurality of processing units to outside said information-processing apparatus; and
   a mode-controlling unit operable to select either a first operation mode or a second operation mode;
   each of said plurality of processing units comprising:
      a calculation unit operable to calculate according to a predetermined calculation;
      a local memory; and a first selector operable to:
   connect said calculation unit to said local memory when said mode-controlling unit selects the first operation mode; and
   connect said local memory to said interface unit when said mode-controlling unit selects the second operation mode, so as to allow said local memories of said plurality of processing units to be collectively accessed from the outside via said interface unit.

\* \* \* \* \*